United States Patent [19]

Murayama

[11] Patent Number: 4,630,160
[45] Date of Patent: Dec. 16, 1986

[54] DEVICE FOR INSTALLING ELECTRONIC EQUIPMENT ON A VEHICLE

[75] Inventor: Masato Murayama, Kawagoe, Japan

[73] Assignee: Honda Giken Kogyo Kabushiki Kaisha, Tokyo, Japan

[21] Appl. No.: 419,197

[22] Filed: Sep. 17, 1982

[30] Foreign Application Priority Data

Sep. 19, 1981 [JP] Japan .................. 56-148256
Sep. 19, 1981 [JP] Japan .................. 56-148262
Mar. 30, 1982 [JP] Japan ................ 57-45271[U]
Mar. 31, 1982 [JP] Japan ................ 57-46302[U]

[51] Int. Cl.$^4$ .................. G11B 00/00; A47B 81/06
[52] U.S. Cl. ......................... 360/137; 296/37.1; 312/7.1; 455/89
[58] Field of Search ............... 312/7.1, 223; 296/37.1, 296/78.1; 455/78, 89, 351; 360/137

[56] References Cited

U.S. PATENT DOCUMENTS 3,824,472  7/1974  Engel et al. .................. 360/93 X
3,947,954  4/1976  Weiler .......................... 296/37.1
4,031,721  6/1977  Anderson ........................ 312/223
4,436,350  3/1984  Jolin ............................. 312/7.1

Primary Examiner—John H. Wolff
Attorney, Agent, or Firm—Birch, Stewart, Kolasch & Birch

[57] ABSTRACT

A device for installing electronic equipment on a vehicle, especially a motorcycle. The device is formed by a first casing containing the electronic equipment and a second casing fixed to a body of the vehicle so that the electronic equipment is easily removed. A latching member and a lock assembly is used for removably connecting the first and second casing. Each of first and second casings are preferably provided with one of a pair of electric connectors so that electric connection is automatically made when the first casing is placed in the second casing. In order to insulate vibrations, the device is provided with a vibration absorption member which is disposed between the electronic equipment and the first casing.

34 Claims, 12 Drawing Figures

DEVICE FOR INSTALLING ELECTRONIC EQUIPMENT ON A VEHICLE

BACKGROUND OF THE INVENTION

The present invention relates to a device for installing electric or electronic equipment, such as audio devices, on a vehicle, especially on a motorcycle.

In recent years, motorcycles are equipped with various electronic devices such as a transceiver, a radio receiver, or a cassette receiver.

In installing such devices, it is necessary to secure the device while isolating it from vibrations of the motorcycle. In addition, the device has to be protected from water, and even from burglary without impairing the ease of operation.

Furthermore, it is preferable that the electronic equipment is readily disconnected from the body of the motorcycle.

SUMMARY OF THE INVENTION

An object of the invention is therefore to provide a device for installing electric equipment on a vehicle, which easily allows the disconnection of the equipment from the body of the vehicle, and includes sufficient waterproof and burglary preventing functions without deteriorating the facility of operation of the electronic equipment.

According to the present invention, the installing device comprises a first casing means for containing the electronic equipment therein and a second casing means fixed to a body of the vehicle for removably receiving the first casing means therein.

The foregoing and other objects and advantages of the present invention will become more clearly understood upon review of the following description taken in conjunction with the accompanying drawings.

BRIEF DESCRIPTION OF THE DRAWINGS

In the drawings in which like reference numerals denote like parts.

DETAILED DESCRIPTION OF PREFERRED EMBODIMENTS

Figure 1:
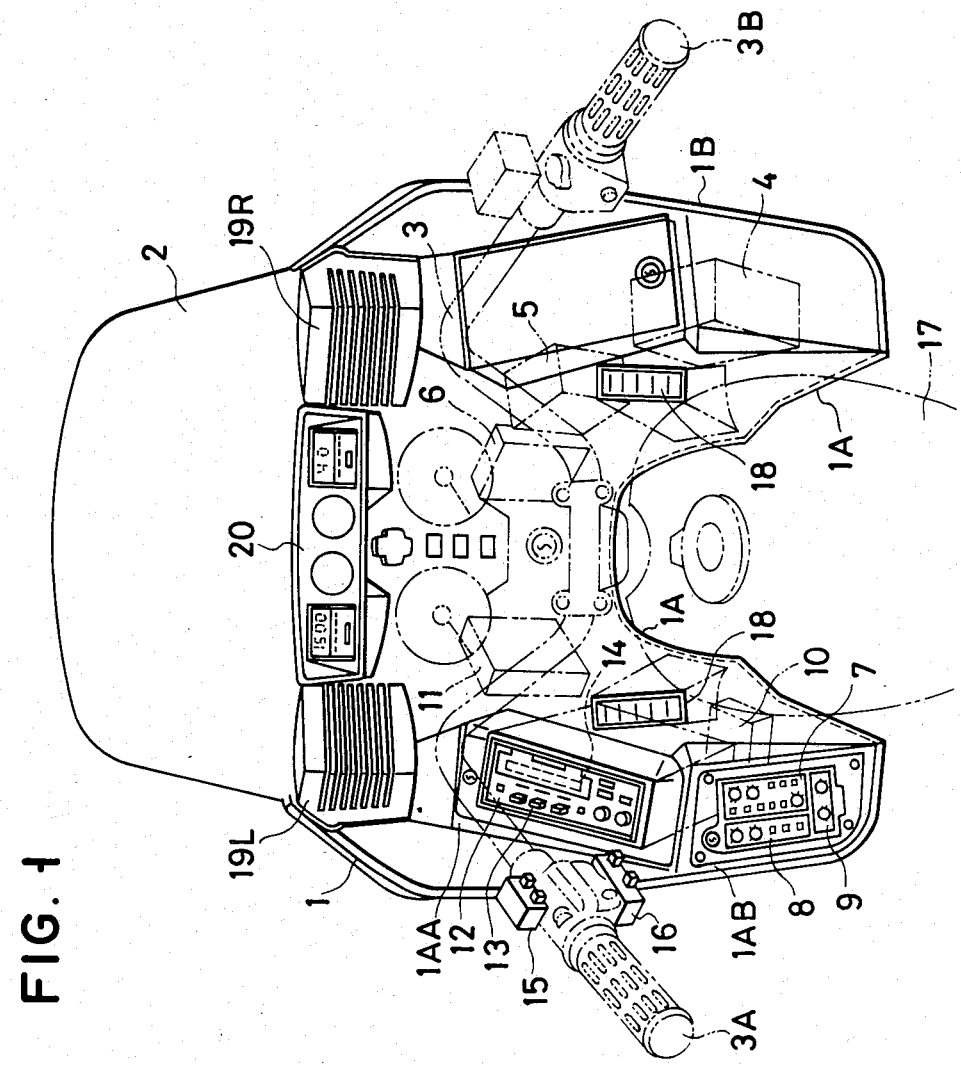
FIG. 1 is a general view of an example of a front cowl of a motorcycle on which the installing device according to the present invention is to be used.

Reference is first made to FIG. 1 in which an example of an arrangement of electric equipment on a front cowl of a motorcycle is illustrated.

Figure 2:
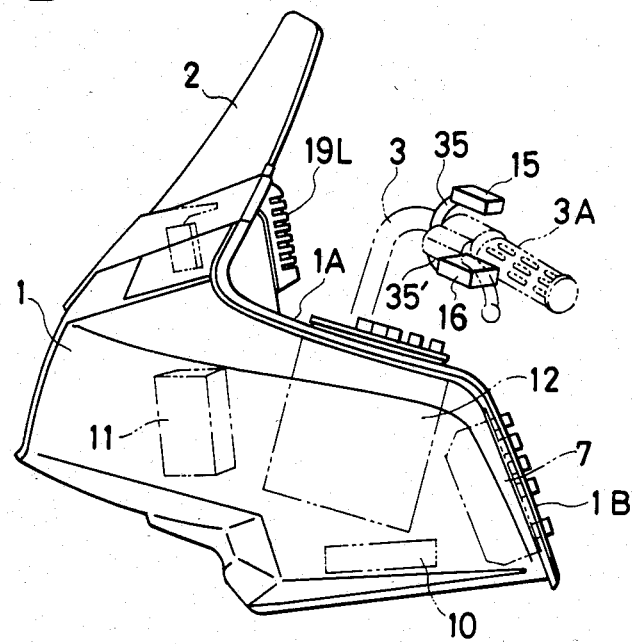
FIG. 2 is a side view showing a lefthand side of the front cowl shown in FIG. 1.
Figure 3:
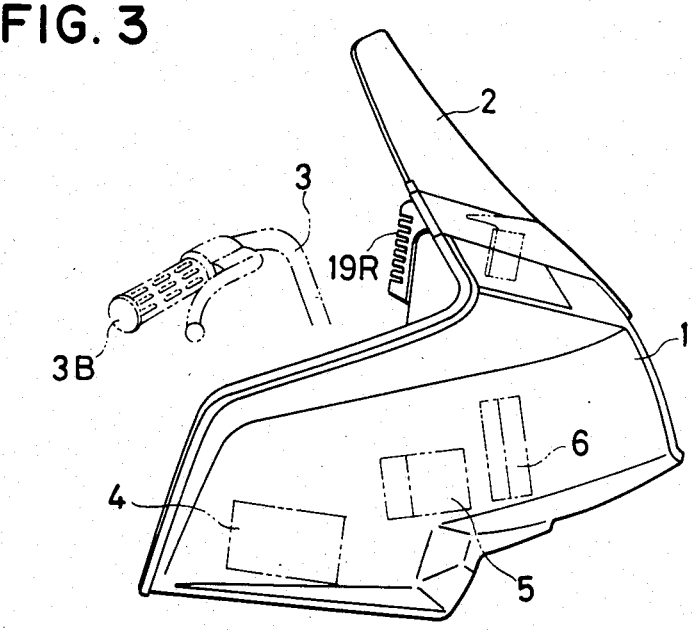
FIG. 3 is a side view similar to FIG. 2, showing a righthand side of the front cowl shown in FIG. 1.

As seen from FIGS. 1 through 3, a front cowl 1 is attached to a body of the motorcycle and is made of an inner panel 1A and an outer panel 1B which are integral with each other. A steering handle is provided which may be movable independently of the front cowl 1. The inner panel 1A is integrally connected to the inner wall of the outer panel 1B so as to define an arcuated hollow chamber or space extending along the inner wall of the outer panel 1B. The inner panel 1A has a generally U-shaped cross section in a horizontal plane and its leg portions extend rearwardly of the motorcycle and are formed into a pair of inwardly protruded and arcuated portions respectively forming left-hand and right-hand hollow spaces together with the lower portions of the outer panel 1B, which spaces are near and beneath left-hand and right-hand grips 3A and 3B. Within the right-hand side chamber, various electric circuit parts of the electric equipment are disposed such as a radio main unit 4, a transceiver main unit 5 and a power amplifier unit 6.

Within the left-hand side chamber are installed various control units such as a radio control unit 7, a transceiver control unit 8, an intercom control unit 9, an antenna distributer unit 10, a multi-changer unit 11 and a cassette tape player 12. It is to be understood that the manually operable parts such as buttons and dials of the control units are favourably positioned near and beneath the left-hand grip 3A, thereby performing facilitated handling of the manually operable parts.

As seen from FIG. 1, each leg portion of the inner panel 1A has a gradually inclined portion 1AA gradually inclined downwardly from the front part thereof in the rearward direction and a steeply inclined portion 1AB being continuous to the portion 1AA and rearwardly downwardly inclined more steeply than the portion 1AA thereby forming the rear end of the panel 1A. The two inclined portions 1AA and 1AB respectively have apertures through which the manually operable parts of the cassette tape player 12 and the control units 7 through 9 are exposed to the outside of the chamber along the upper surfaces of the respective inclined portions 1AA and 1AB. Furthermore, the manually operable parts of the control units 7 through 9 are downwardly inclined toward the center of the motorcycle thereby providing facilitated handling by the rider of the motorcycle.

As illustrated in FIG. 1, a radio select switch 15 and a transceiver talk switch 16 are fixed on the handle 3 adjacent to the grip 3A. The motorcycle includes a fuel tank 17, a pair of air duct openings 18 and a meter console 20 having various indicators indicating various operational conditions of the electric equipments which are fixed to the front cowl 1.

The switches 15 and 16 are preferably connected to the steering handle 3 through fastening means 35 at positions close to the left-hand grip 3A.

As being well known in the art, the electric parts excluding the manually operable parts usually produces much more heat than the manually operable parts. Thus, the circuit parts and the control unit excluding the manually operable parts are preferably positioned close to the air duct opening thereby effectively performing radiation of the heat generated in those parts. The meter console 20 is, on the other hand, positioned around the center of the front cowl 1 and near the screen 2 so as to make the driver easily observe the console 20.

As illustrated in FIGS. 1 through 3, left speaker 19L and right speaker 19R together with windscreen 2 are connected to the front cowl 1.

As shown in FIG. 1, the cassette tape player unit 12 is installed in the front cowl 1 by means of a device according to the invention in such a manner as to be angled towards the rear, i.e., the driver's side. Furthermore, an eject button 13 is disposed at the outer side of the body in relationship to a cassette ejection slot 14. With this arrangement the handling of a cassette tape is greatly facilitated. More specifically, when an operator, that is the driver of the motorcycle, presses the eject button 13 by the middle finger of the left hand, the cassette tape ejected from the slot 14 is automatically received in the palm of the left hand, thus preventing mishandling.

Figure 4:
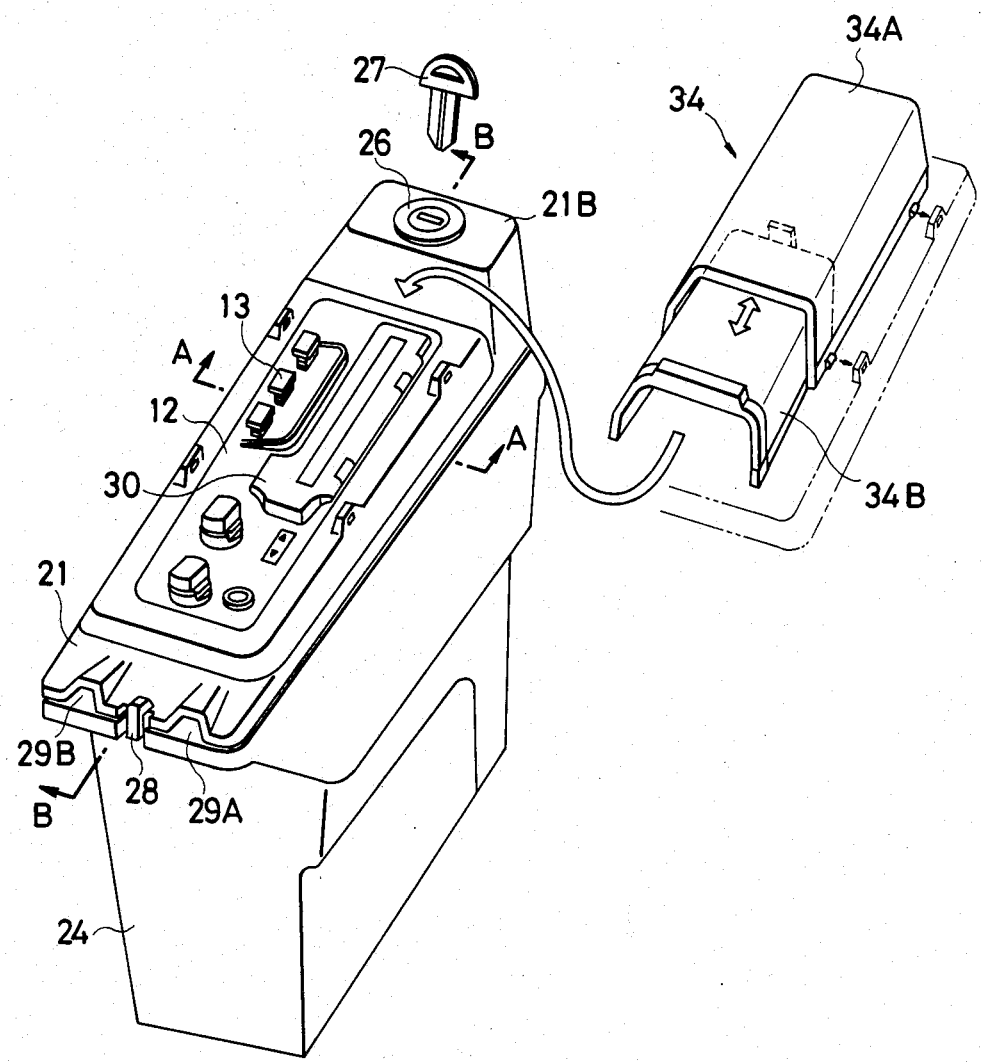
FIG. 4 is a general perspective view of a first embodiment of the device according to the present invention, used for installing a cassette tape player unit.
Figure 5:
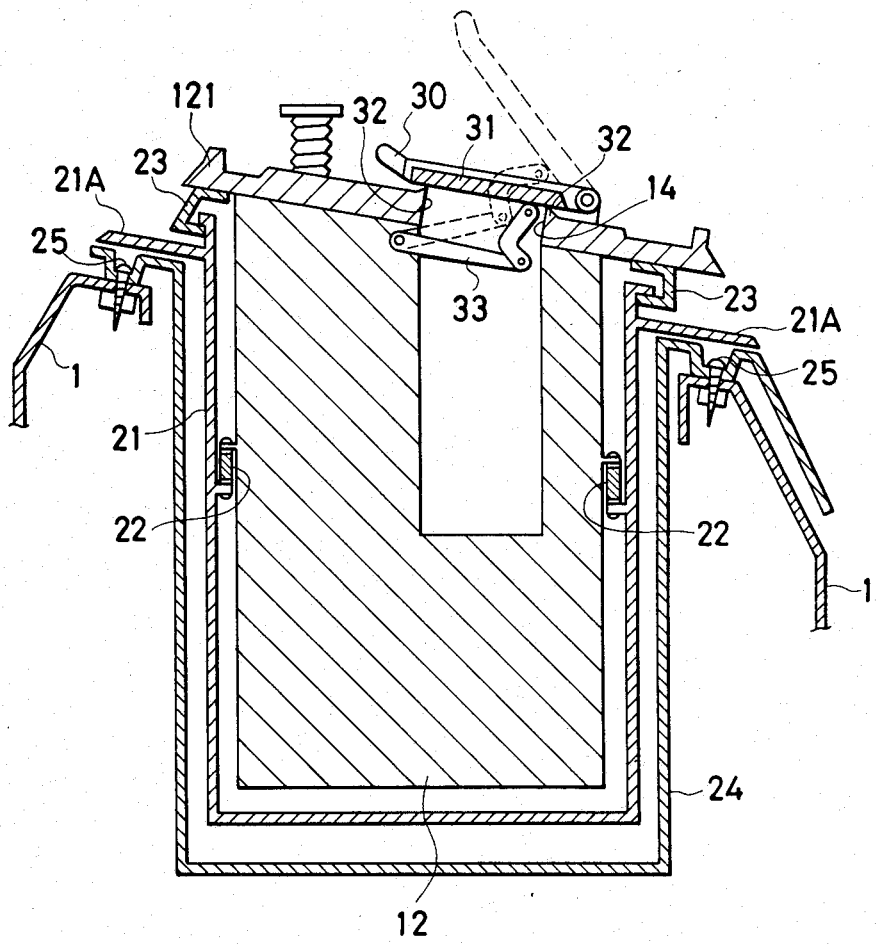
FIG. 5 is a vertical cross-sectional view taken along a plane of lines A—A of FIG. 4 showing the general structure of the device.
Figure 6:
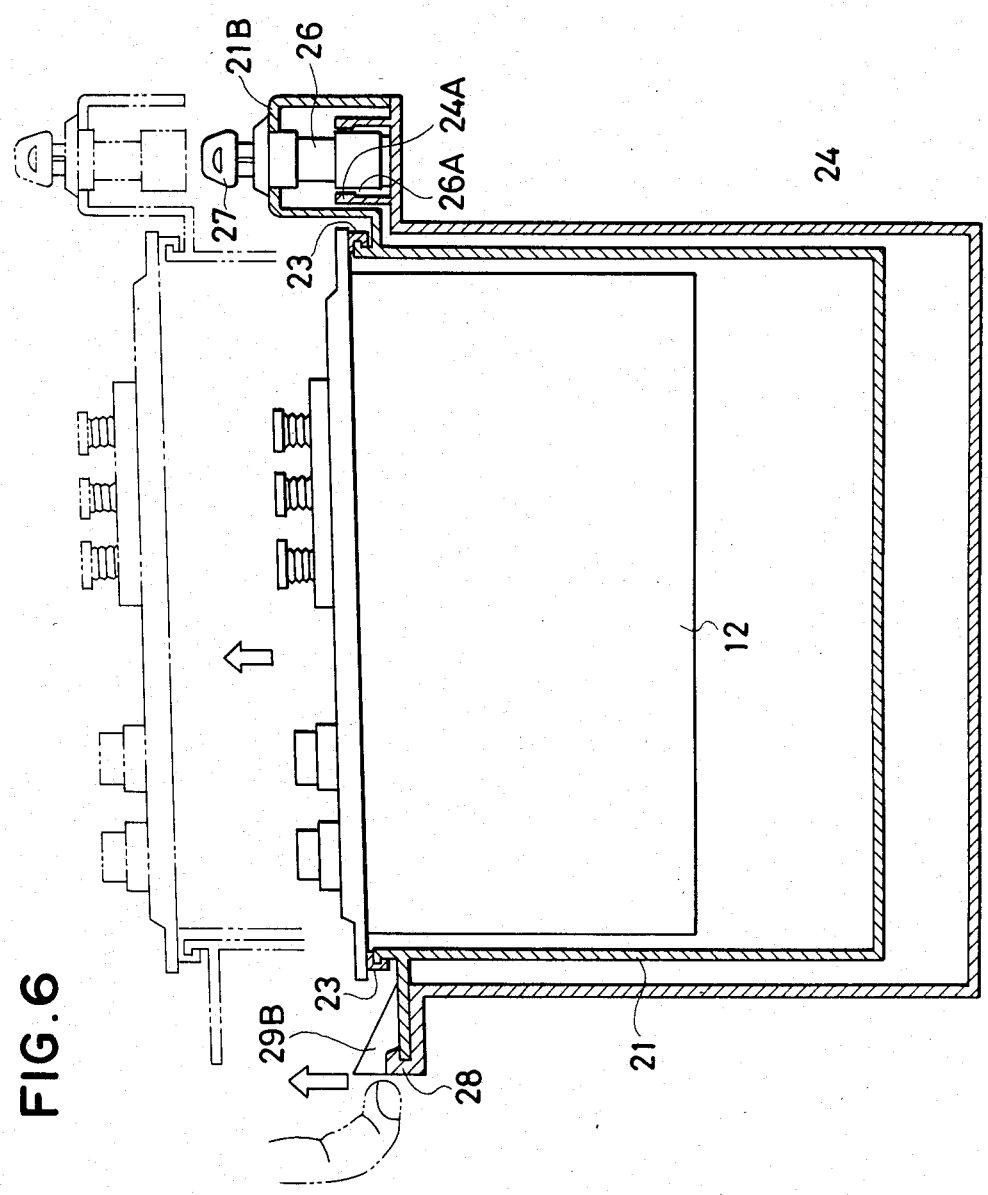
FIG. 6 is a vertical cross-sectional view similar to FIG. 5, taken along a plane of lines B—B of FIG. 4, showing the states in which the cassette tape player unit is placed and withdrawn respectively.

Turning to FIGS. 4 through 6, a first embodiment of the installing device according to the present invention will be explained hereinafter.

As shown in the figures, the installing device comprises an inner case 21 which receives the cassette tape player unit 12 and an outer case 24 which is connected to the front cowl 1 by means of a plurality of screws 25.

The cassette tape player unit 12 is supported in the inner case 21 via a pair of rubber supports 22 so as to insulate the vibration from an engine of the motorcycle through the inner case 21.

A seal rubber 23 is disposed between a panel 121 of the cassette tape player unit 12 and a peripheral edge of the inner case 21 so as to prevent water from permeating into the interior of the inner case 21.

Futhermore, the inner case 21 is provided with a flange 21A which conceals the head portion of the screws 25 (see FIG. 5).

In this example, a lid 30, pivotally connected to the panel 121, is used for covering the cassette ejection slot 14. A seal rubber 31 is provided on the inner face of the lid 30 so as to cooperate with a projection 32 formed at the peripheral portion of the cassette ejection slot on the panel 121 to prevent water penetration. A link mechanism 33 is provided for retaining the lid 30 in desired positions.

In addition, a cover assembly 34 comprising an outer member 34A is connectable to the panel 121 of the cassette tape player 12. An inner member 34B, slidably received in the outer member 34A, is preferably provided on the cassette tape player unit so as to cover the control buttons on the panel 121.

In order to fix the inner case 21 to the outer case 24, a clamp 28 and a lock means 26 are provided. The clamp 28 and the lock means 26 will be explained with reference to FIGS. 4 and 6.

As shown in FIG. 4, the outer case 24 is provided with the clamp 28 for fixing the inner case 21 at the rear end thereof, i.e., the lower end of the top face.

As shown in FIG. 4, the clamp 28 is cooperative with a notch formed at a corresponding part of a flange portion 21A of the inner case 21 which is typically illustrated in FIG. 5. The clamp 28 and the notch of the flange portion 21A together form a first fixing means. Also, the lock means 26 is provided to the front end portion 21B of the inner case 21, i.e., the upper end of the top face.

As shown in FIG. 6, the lock means 26 comprises a key cylinder assembly having a lock member 26A rotatable by a key 27. At a position on the outer case corresponding to the lock member 26A of the lock means, there is provided a hook 24A engageable therewith.

The lock member 26A and the hook 24A together form a second fixing means.

When the inner case 21 is placed in the outer case 24, the lock member 26A is automatically engaged with the hook 24A due to the slope formed on the side face thereof. The lock member 26A can be disengaged from the hook by turning the key 27.

As shown in FIG. 4, at the rear end of the flange portion 21A of the inner case 21, there are provided a pair of generally cone-shaped bending portions 29A and 29B so that the inner case 21 can be lifted by fingertips when the cassette tape player unit 12 is to be removed from the front cowl 1.

Figure 7:
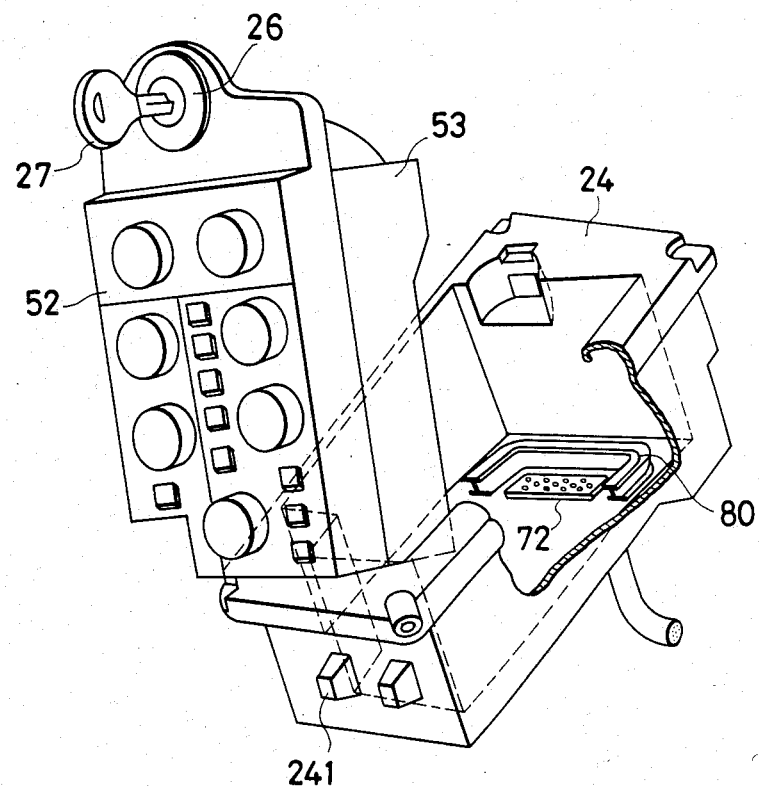
FIG. 7 is a general perspective view of a second embodiment of the installing device according to the present invention, used for installing an audio control unit, showing a state in which the audio control unit is withdrawn.
Figure 8:
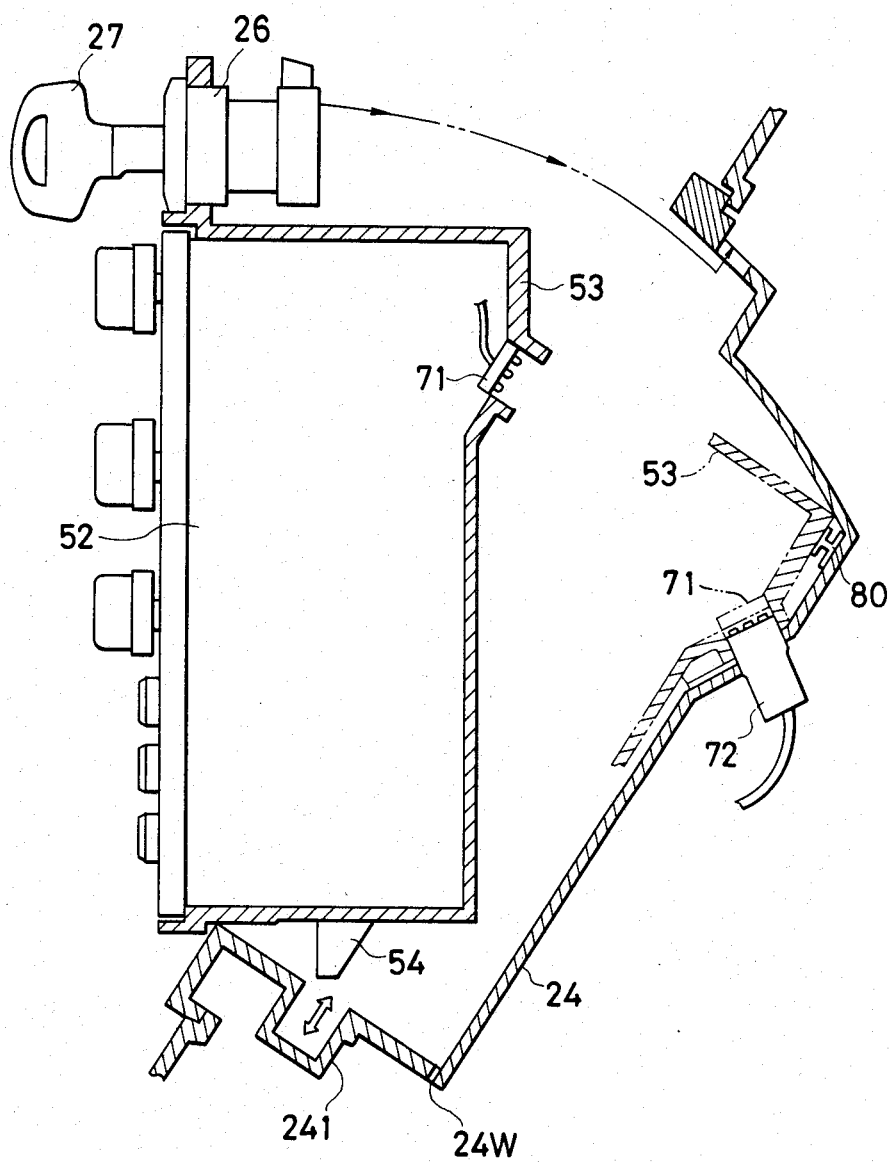
FIG. 8 is a vertical cross-sectional view of the installing device, corresponding to FIG. 7.

Reference is now made to FIGS. 7 and 8, a second embodiment of the installing device according to the present invention will be explained.

In the second embodiment, an audio control unit 52 which may correspond to the control units 7, 8 and 9 is received in the outer case 24 and the inner case 21 which is used in the first embodiment is eliminated. The second embodiment features a pair of electric connector members provided on a case 53 of the audio control unit and provided on the outer case 24. The case 53 is connected to the outer case 24 in a similar manner as in the first embodiment. However, instead of the engagement between the clamp 28 and the flange 21A in the first embodiment, a pair of protrusions 54 formed on the rear end of the case 53 and a pair of recesses 241 formed on the corresponding portion of the outer case 24 are utilized to fix the case 53 and the outer case 24 together. Similarly, a lock member 26A of the lock means 26 is received in an opening 242 formed on the outer case 24 instead of the hook 24A in the first embodiment (see FIG. 8).

The electric connector members comprise a first connector member 71 constituted, in this case, by a number of pins fixed to the bottom of the case 53 and a second connector member 72 fixed to the bottom of the outer case 24. Each connector member 71, 72 is positioned on the case 53 and the outer case so as to be facing each other. In this manner, the electric connection between the first and second connector members 71 and 72 is automatically made when the case 53 is received in the outer case 24.

In order to prevent water from flowing into the connector members 71 and 72, a seal member 80 made of rubber, for example, is provided on the bottom of the outer case 24 in a manner such that the seal member 80 surrounds the second connector member 72 except at the lower side end thereof so as to easily permit discharge of the water (see FIG. 8). Water may be discharged from the outer case 24 through the opening 24W.

The thickness of the seal member 80 is determined slightly larger than the gap between the case 53 and the outer case 24 so as to ensure the sealing function and also to operate as a shock absorbing device between the case 53 and the outer case 24.

Since the case 53 of the audio control unit 52 and the outer case 24 are usually disposed in a manner which is inclined to the rear of the motorcycle, the arrangement of the seal member 80 shown in FIG. 8 is quite advantageous to prevent water from flowing into the portion in which the connector member 72 is fixed.

Figure 9:
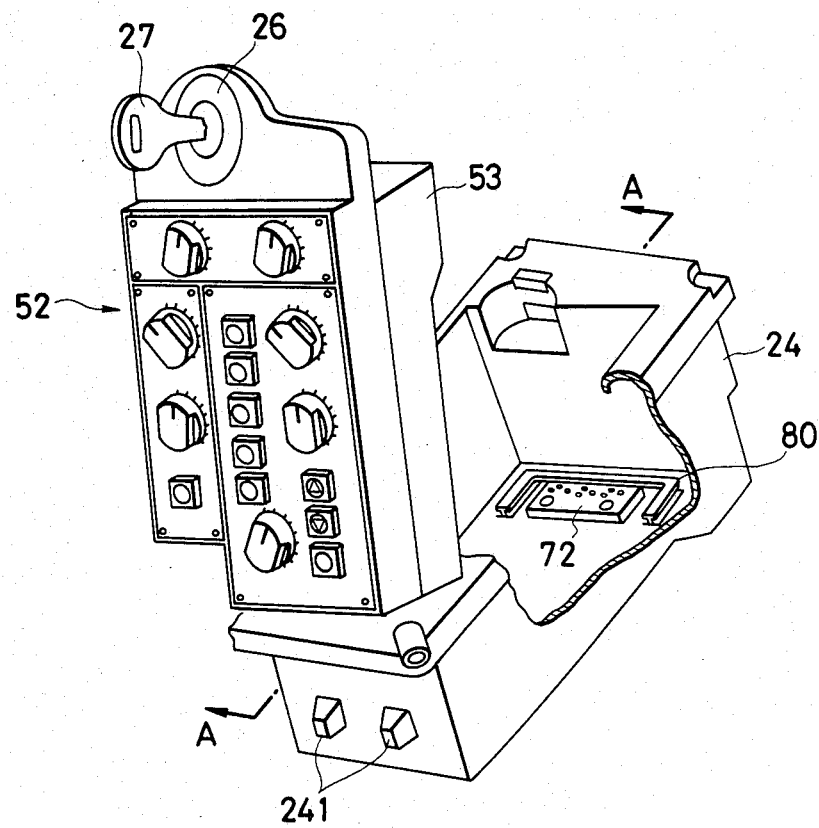
FIG. 9 is a general perspective view of a modification of the second embodiment of the installing device according to the present invention, used for installing an audio control unit, showing a state in which the audio control unit is withdrawn.
Figure 10:
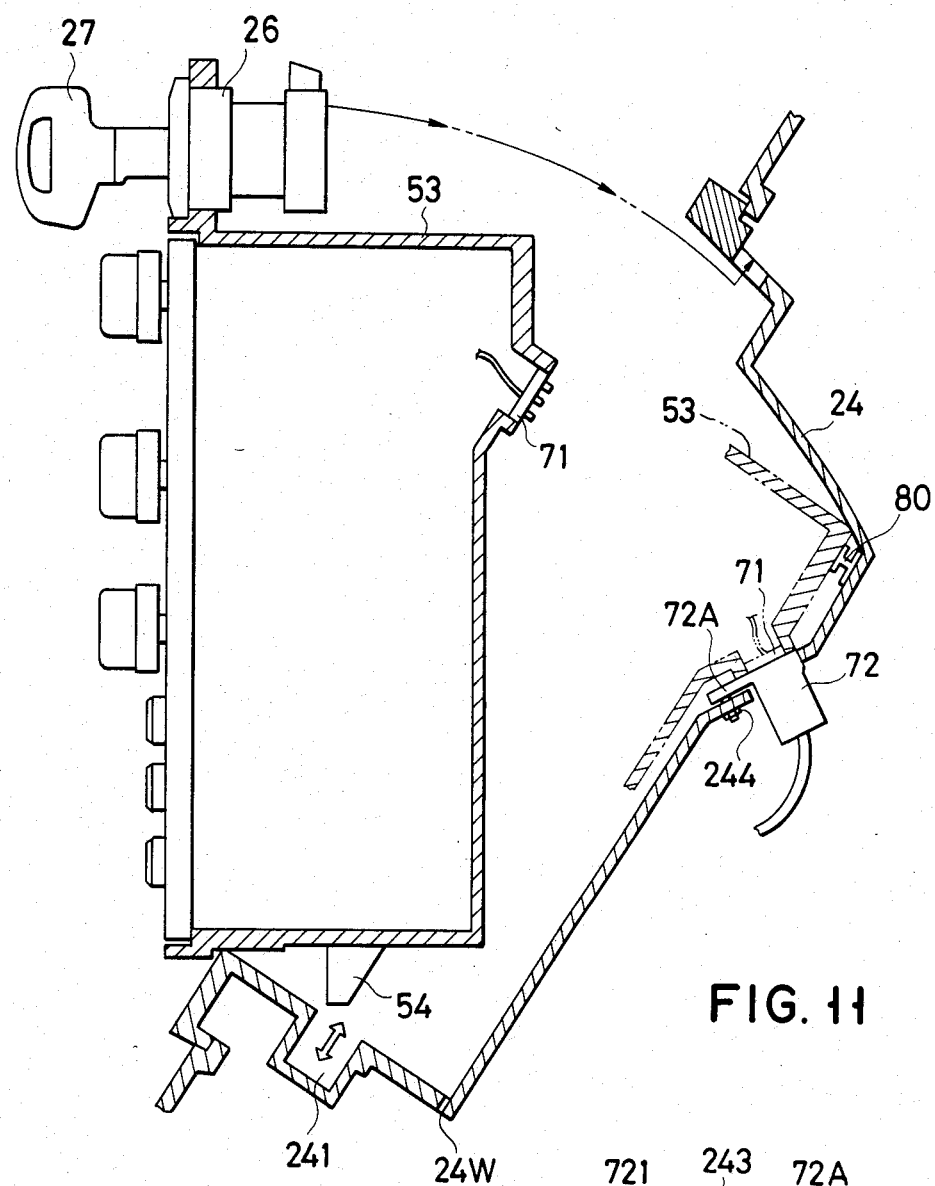
FIG. 10 is a vertical cross-sectional view of the installing device, corresponding to FIG. 9.
Figure 11:
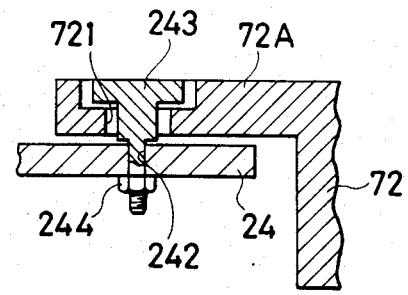
FIG. 11 is an enlarged sectional view showing the relation between a flange portion of a connector and an outer case.

Turning to FIGS. 9 through 11, a modification of the second embodiment will be explained.

As shown in FIGS. 9 and 10, the modification has a similar construction as the second embodiment shown in FIGS. 7 and 8. However, in this modification the second connector member 72 is slidably disposed on the bottom of the outer case 24.

As shown in FIG. 11, the second connector member 72 is provided with a flange portion 72A in which a pair of through holes 721, each includes upper and lower portions of different diameters.

A pair of studs 243, each having a widened head portion, is fixed to the outer case 24 by means of a threaded end thereof and a nut 244.

With this arrangement, the second connector member is slidably mounted in an opening formed on the bottom of the outer case 24 in directions substantially parallel to the bottom face of the outer case 24.

Since the second connector member 72 is slidably mounted on the outer case 24, the position thereof is automatically adjusted to the position of the first connector member fixed to the case 53. Thus, when the case 53 is received in the outer case 24 the connection between the first and second connector member 71 and 72 is facilitated.

Figure 12:
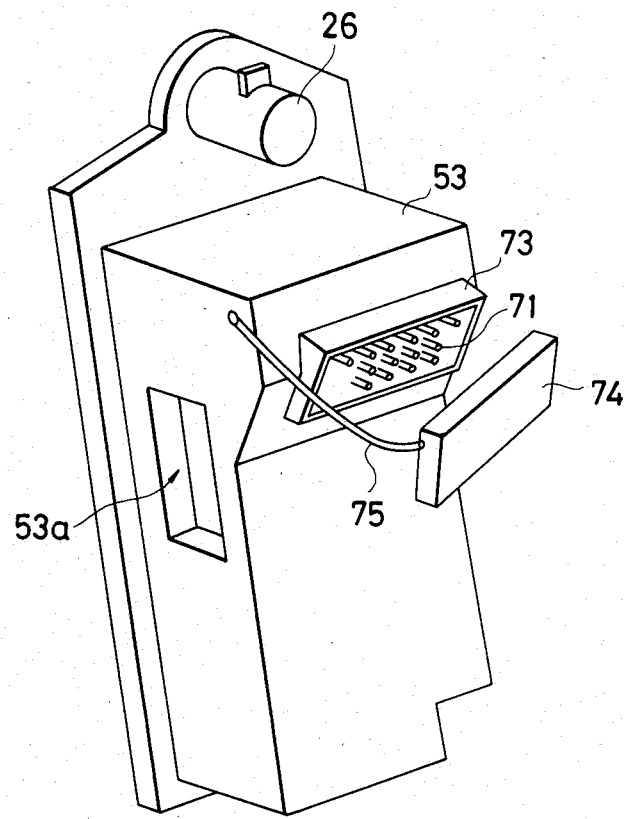
FIG. 12 is a general perspective view showing a further modification of the second embodiment of the invention in which the connector member is surrounded by a rectangular protrusion.

FIG. 12 shows a further modification of the second embodiment of the invention in which the connector member 71 is surrounded by a rectangular protrusion 73 formed at the bottom of the case 53. The height of the protrusion is larger than that of the pins of the connector member 71. A cap member 74 is provided which is fixed by means of a flexible fixing line or wire 75 to the case 53 and is contoured to be engageable with the protrusion 73 so as to protect the connector member 71 especially in the case when the case 53 is disconnected from the outer case 24. The cap member 74 may be accommodated into a recess 53 formed on the side wall of the case 53 when the case 53 is accommodated into the outer case 24.

As will be readily understood from the foregoing, a device for installing electronic equipment on a vehicle, having sufficient waterproof and vibration insulation fuctions is provided according to the present invention.

Especially, the electronic equipment is readily disconnected from the body of the motorcycle by using a pair of electric connector members respectively connected to the case of the electronic equipment and the outer case fixed to the body of the motorcycle. Moreover, the electronic equipment is protected from burglary by the provision of the lock means which is only accessible by means of a key.

In addition, because of the water tight structure of the lid which covers the cassette ejection slot, and a cover assembly for the control panel, use of the cassette tape player is made possible even in the rain.

Above, preferred embodiments of the present invention have been described. It should be understood, however, that the foregoing description is for illustrative purpose only, and is not intended to limit the scope of the invention. Rather, there are numerous equivalents to the preferred embodiments, and such are intended to be covered by the appended claims.

What is claimed is:

1. A device for detachably mounting an audio-type electronic console on a motorcycle, said device having a double-box like structure for protecting the audio-type electronic console from environmental exposure experienced on a motorcycle, comprising:
    a substantially box shaped inner case for containing the electronic console therein; and
    a substantially box shaped outer case slightly larger than said inner case and fixed to a front cowl of the motorcycle, said inner case being detachably mounted within said outer case.

2. A device as recited in claim 1, further comprising a first fixing means and a second fixing means with a lock means for detachably connecting said inner and outer cases, wherein said first fixing means is provided at an end of said inner case and a corresponding end of said outer case and said second fixing means is provided at another end of said inner case and a corresponding end of said outer case.

3. A device as recited in claim 2, wherein said first fixing means comprises a hook member provided at an end of said outer case and a flange with a notch cooperative therewith formed at a corresponding portion of said inner case.

4. A device as recited in claim 2, wherein said first fixing means comprises protrusions formed on said inner case and recesses cooperative therewith formed at corresponding portions of said outer case.

5. A device as recited in claim 2, wherein said lock means comprises a key and a key cylinder assembly fixed to said inner case having a projected lock member rotatable by said key, and a recess cooperative with said lock member, formed in a corresponding portion of said outer case.

6. A device as recited in claim 2, wherein said outer case is fixed to said front cowl of the motorcycle in a manner such that the lowest face of said outer case is inclined.

7. A device as recited in claim 2, wherein said first fixing means and second fixing means with lock means are placed at front and rearward ends of said inner and outer cases with respect to a normal running direction of the motorcycle.

8. A device as recited in claim 2, wherein said inner case is provided with at least a bending portion adjacent to said latching means so that the inner case can easily be lifted at said bending portion by fingertips.

9. A device as recited in claim 1, further comprising a pair of electric connectors respectively fixed to said inner and outer case.

10. A device as recited in claim 9, further comprising a sealing member disposed between said inner and outer case, adjacent to said electric connectors.

11. A device as recited in claim 10, wherein said sealing member has an open end to discharge water at the lower side thereof.

12. A device as recited in claim 9, further comprising protecting means connected to said inner case for protecting said electric connector mounted on said inner case.

13. A device as recited in claim 12, wherein said protecting means includes a protrusion formed on said inner case and surrounding said electric connector, and a cap member engageable with said protrusion.

14. A device as recited in claim 13, wherein said cap member is connected via a flexible line to said inner case.

15. A device as recited in claim 14, wherein said inner case includes a recess for receiving said cap member.

16. A device as recited in claim 1, wherein the electronic console is supported in said inner case by means of a vibration absorbing means.

17. A device as recited in claim 16, wherein said vibration absorbing means comprises a rubber member disposed between the electronic console and said inner case.

18. A device as recited in claim 1, wherein said outer case is fixed to said body of the motorcycle by a plurality of screws and wherein said inner case is provided with flange portions to conceal said screws.

19. A device for detachably mounting a cassette tape player console having an operation panel in which a set of operational parts are placed, on a motorcycle, said device having a double-box like structure for protecting the cassette tape player console from environmental exposure experienced on a motorcycle, comprising:
 a substantially box shaped inner case for containing the cassette tape player console therein; and
 a substantially box shaped outer case slightly larger than said inner-case and fixed to a body of the motorcycle;
 said inner case is detachably connected to said outer case.

20. A device as recited in claim 19, wherein said set of operational parts includes at least an eject button and a cassette ejection slot, characterized in that said cassette tape player console is received in said inner case in such a manner that said cassette eject button is disposed at an outer side of the body of the motorcycle relative to said cassette ejection slot.

21. A device as recited in claim 19, further comprising a cover means for covering said panel.

22. A device as recited in claim 21, wherein said cover means comprises a first cover member detachably connected to said panel and a second cover member slidably received in said first cover member.

23. A device as recited in claim 19, further comprising a vibration absorbing member disposed between the cassette tape player unit and said inner case and a vibration absorbing sealing member disposed between a peripheral portion of said panel and a flange portion formed on said inner case.

24. A device as claimed in claim 19, further comprising a lid pivotally provided on said cassette ejection slot of said panel.

25. A device as claimed in claim 24, wherein said lid is provided with a sealing member at an inner surface thereof and a protruded portion is formed on peripheral portion of said cassette ejection slot so as to be water tight when said lid is closed.

26. A device for detachably mounting an audio-type electronic console on a motorcycle, said device having a double-box like structure for protecting the audio-type electronic console from environmental exposure experienced on a motorcycle, comprising:
 an assembled unit containing the audio-type electronic console fixed at a brim of said assembled unit and being covered by a lid of said assembled unit, and
 a substantially box shaped casing slightly larger than said assembled unit and fixed to an inside segment of a motorcycle fairing for detachably receiving said assembled unit therein, wherein said box shaped casing containing said assembled unit is disposed on an inside of said fairing of said motorcycle so that a control panel of said audio-type electronic console is inclined rearwardly with respect to a normal running direction of the motorcycle.

27. A device according to claim 26, wherein said audio-type electronic console is a radio.

28. A device according to claim 26, wherein said audio-type electronic console is a tape recorder.

29. A device according to claim 26, wherein said audio-type electronic console is a CB radio transceiver.

30. A device for detachably mounting an audio-type electronic console on a motorcycle, said device having a double-box like structure for protecting the audio-type electronic console from environmental exposure experienced on a motorcycle, comprising:
 a substantially box shaped casing fixed to an inside segment of a motorcycle fairing, and
 an assembled unit containing the audio-type electronic console fixed to a brim of said assembled unit and being covered by a lid of said assembled unit, wherein said assembled unit is detachably received in said substantially box shaped casing, and said brim has a flange portion which overhangs a brim of said substantially box shaped casing when said assembled unit is received in said substantially box shaped casing.

31. A device according to claim 30, wherein said brim of assembled unit is provided with a lock means.

32. A device according to claim 30, wherein said audio-type electronic console is a radio.

33. A device according to claim 30, wherein said audio-type electronic console is a tape recorder.

34. A device according to claim 30, wherein said audio-type electronic console is a CB radio transceiver.

* * * * *